US006826154B2

(12) United States Patent
Subbiah et al.

(10) Patent No.: US 6,826,154 B2
(45) Date of Patent: Nov. 30, 2004

(54) METHOD AND APPARATUS FOR SEAMLESS MOBILITY BETWEEN DIFFERENT ACCESS TECHNOLOGIES

(75) Inventors: Barani Subbiah, Sunnyvale, CA (US); Javad Razavilar, San Diego, CA (US)

(73) Assignee: 3COM Corporation, Marlborough, MA (US)

( * ) Notice: Subject to any disclaimer, the term of this patent is extended or adjusted under 35 U.S.C. 154(b) by 215 days.

(21) Appl. No.: 09/865,110

(22) Filed: May 24, 2001

(65) Prior Publication Data

US 2002/0191627 A1 Dec. 19, 2002

(51) Int. Cl.[7] .................................................. H04J 3/14
(52) U.S. Cl. ...................... 370/236; 370/331; 370/401; 455/433; 455/436
(58) Field of Search ................................. 370/331, 338, 370/352, 390, 401, 409, 410, 901, 522, 236; 455/426, 432, 433, 436, 435, 552

(56) References Cited

U.S. PATENT DOCUMENTS

| 5,159,592 A |   | 10/1992 | Perkins |   |
|---|---|---|---|---|
| 5,473,599 A |   | 12/1995 | Li et al. |   |
| 5,572,528 A | * | 11/1996 | Shuen ........................ | 370/338 |
| 5,619,552 A |   | 4/1997 | Karppanen et al. |   |
| 5,659,544 A | * | 8/1997 | La Porta et al. ............ | 455/433 |
| 5,901,352 A | * | 5/1999 | St-Pierre et al. ............ | 455/433 |
| 5,912,878 A |   | 6/1999 | Park et al. |   |
| 5,940,371 A | * | 8/1999 | Mitts et al. .................. | 370/236 |
| 6,137,791 A | * | 10/2000 | Frid et al. .................... | 370/331 |
| 6,144,671 A | * | 11/2000 | Perinpanathan et al. .... | 370/410 |
| 6,430,395 B2 | * | 8/2002 | Arazi et al. .................. | 370/347 |
| 6,501,746 B1 | * | 12/2002 | Leung ......................... | 370/338 |
| 6,611,547 B1 | * | 8/2003 | Rauhala ....................... | 370/331 |
| 6,643,279 B1 | * | 11/2003 | Li et al. ....................... | 370/331 |

FOREIGN PATENT DOCUMENTS

| EP | 0851633 A2 | * | 7/1998 | ........... H04L/12/28 |
| EP | 0 01094647 A2 | * | 4/2001 | ........... H04L/29/06 |
| GB | 2374494 A | * | 10/2002 | ............ H04Q/7/38 |

OTHER PUBLICATIONS

"Bluetooth Protocol Architecture—Version 1.0," White Paper developed by the Bluetooth Special Interest Group (SIG), Aug. 25, 1999, pp. 1–20.

(List continued on next page.)

Primary Examiner—Duc Ho
Assistant Examiner—Phuongchau Ba Nguyen
(74) Attorney, Agent, or Firm—Ernest J. Beffel, Jr.; Haynes Beffel & Wolfeld LLP

(57) ABSTRACT

The present invention includes a method and device to support hand off of a session between a mobile terminal and a server, while continuing the session. One aspect of the invention is a method involving a first entity having an IP stack and a second entity having an IP stack. These entities support a hand off from one access technology to another, wherein the different access technologies are differentiated by a characteristic such as their physical layer. Particular aspects of the present invention are described in the claims, specification and drawings.

82 Claims, 8 Drawing Sheets

OTHER PUBLICATIONS

"Raw IP Networking FAQ, Version 1.3," 1997, Whitefang Dawt Kawm., Article can be found at http://www.whitefang.com/rin/rawfaq.html.

Akhtar Jameel, Matthias Stuempfle, Daniel Jiang, and Axel Fuchs, "Web on Wheels: Toward Internet–Enabled Cars," Computer, Jan. 1998, vol. 31, No. 1, pp. 69–76.

David B. Johnson and Charles Perkins, "Mobility Support in IPv6," Internet–Draft, IETF Mobile IP Working Group, Nov. 17, 2000.

C. Perkins, "IP Mobility Support," Network Working Group, Oct. 1996.

Charles E. Perkins, "Mobile Networking Through Mobile IP," IEEE Internet Computing, Jan.–Feb. 1998, pp. 58–69.

Mark Stemm, "Vertical Handoffs in Wireless Overlay Networks," Master's thesis, University of California at Berkeley, 1996. Published as UCB Technical Report CSD –96–903. http:// citeseer.nj.nec.com/stemm96vertical.html.

Mark Stemm and Randy H. Katz, "Vertical Handoffs in Wireless Overlay Networks," Mobile Networks and Applications, pp. 335–350, vol. 3, No. 4, (1998). http://citeseer.nj.nec.com/259618.html.

Edmond Sung and Arkady Zaslavsky, "Software assisted handover of mobile clients of heterogeneous wireless computing environments," Proceedings of the Asia–Pacific Software Engineering Conference and International Computer Science Conference, APSEC and ICSC 1997, pp. 557–528, 1997.

* cited by examiner

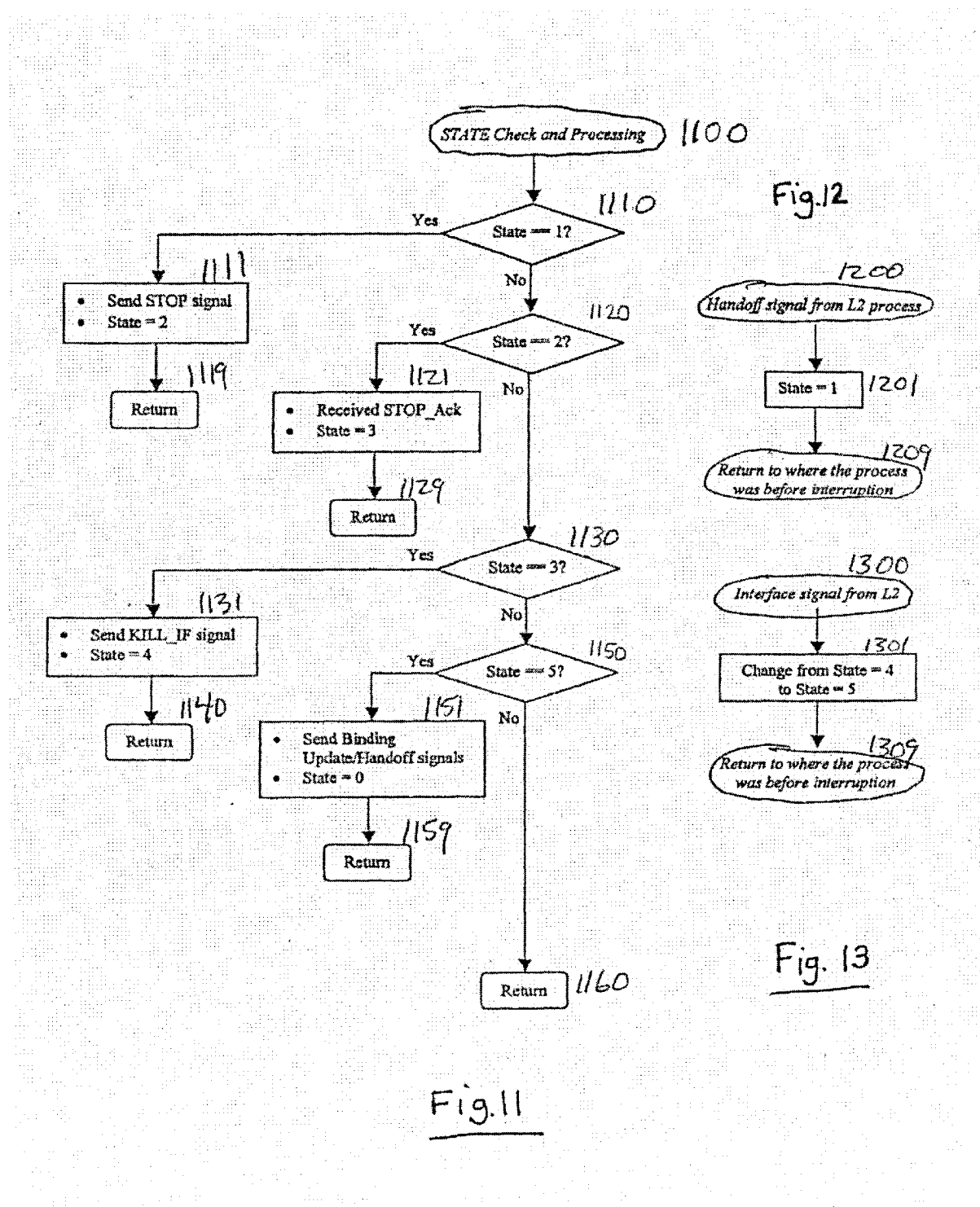

US 6,826,154 B2

METHOD AND APPARATUS FOR SEAMLESS MOBILITY BETWEEN DIFFERENT ACCESS TECHNOLOGIES

RELATED APPLICATIONS REFERENCE

The present invention is related to co-pending U.S. patent application Ser. No. 09/865,120, entitled Method and Apparatus for Seamless Mobility With Layer Two Assistance, invented by Javad Razavilar and Barani Subbiah, filed May 24, 2001, which application was owned at the time of invention and is currently owned by the same assignee, and such application is incorporated by reference as if fully set forth herein.

BACKGROUND OF THE INVENTION

Wireless networking is available to mobile users with higher (wireless local area network or WLAN) and lower (wireless wide area network or WWAN) bandwidth connections. Mobile terminals are available which could remain active as a user goes from areas where higher bandwidth connections are available to areas where lower bandwidth connections are available, or vice versa, or even as they dock in wired docking stations. These mobile terminals can be equipped with adapters for multiple types of network connections. However, switching from one network connection to another has typically required abandoning and re-establishing a network session.

Therefore, it is desirable to introduce methods and devices that support moving from one wireless network to another seamlessly, maintaining an established network session.

SUMMARY OF THE INVENTION

The present invention includes a method and device to support hand off of a session between a mobile terminal and a server, while continuing the session. One aspect of the invention is a method involving a first entity having an IP stack and a second entity having an IP stack. These entities support a hand off from one access technology to another, wherein the different access technologies are differentiated by a characteristic such as their physical layer. Particular aspects of the present invention are described in the claims, specification and drawings.

BRIEF DESCRIPTION OF THE DRAWINGS

FIGS. 9 through 13 are flow charts for processes running on the mobile terminal.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Figure 1:
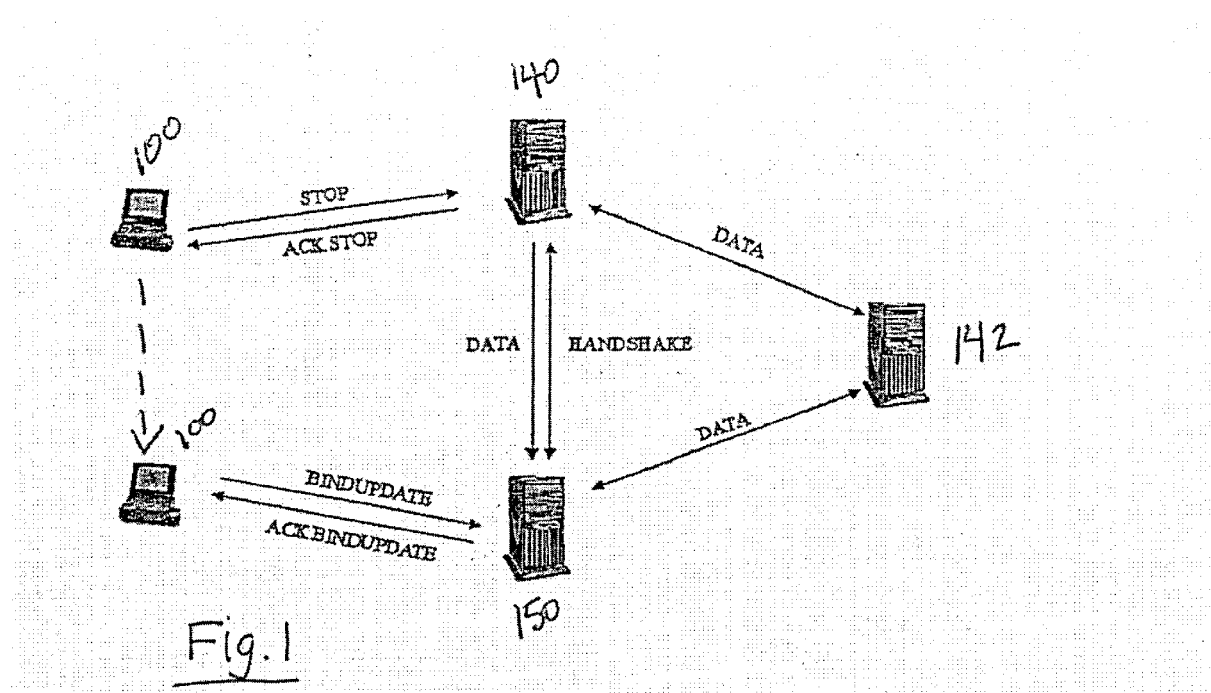
FIG. 1 block diagram of one system in which aspects of the present invention can be practiced.

FIG. 1 is a block diagram of one system in which aspects of the present invention can be practiced. A mobile terminal 100 is equipped with adapters for two different access technologies. These different access technologies may be differentiated by their bandwidth. For example, an access technology compliant with a series of standards known as 802.11x may support 11 or 54 Mbps, while a cellular technology may support 19,200 or 54,600 bps. Access technologies also may be differentiated by their range. Access compliant with a Bluetooth standard may have a short range; WLAN access compliant with 802.11x may have a medium range; wireless broadband access technologies typically provide an extended, line of sight range; cellular technologies, which support handoffs among base stations, provide a wide range. A further basis for differentiation may be service features, such as available security, cost of service, or access to services provided by different vendors that support different access technologies. One of the access technologies may be a docked access technology, when the mobile terminal reaches a wired docking station. The mobile terminal may be a laptop computer, a hand-held computer, a Palm-sized computer, a PDA or any other mobile computing platform. The different access technologies can be supported by built-in adapters or add-on adapters. Built-in adapters may include Bluetooth-compliant RF adapters and laptop docking adapters. Add-on adapters include PCMCIA cards manufactured by 3Com, Lucent, Cisco Systems, and others. Either a pair of adapters or a single combination adapter may be used.

The principal embodiment described below is cast in terms of a WLAN as a first access technology and a WWAN as a second access technology. This description is readily extended by one of ordinary skill in the art to a pair of different access technologies. Paired access technologies may include 802.11x compliant WLAN technology, line-of-sight microwave and RF access technology, unlicensed 2.4 GHz technology, Bluetooth technology, docking station technology (hard wired to a network,) cellular technology, IS 95b compliant technology, enhanced GSM technology, GPRS technology, Metricom technology, WMAN technology, and satellite link technology, such as used in some new automobiles.

The embodiment described below also is cast in terms of an access router. More generally, an entity having an IP stack can support a mobile terminal handoff, without having all the capabilities normally associated with a router. For instance, a wireless access point typically receives a MAC frame and converts it into a network protocol frame, but the access point does not support router functionality. Upgrading the wireless access point by adding an IP stack and other resources may allow the wireless access point to support handoffs, without a separate router. Similarly, a base station for a cellular network may be equipped with an IP stack and resources to support handoffs. Bluetooth-compliant adapters may have an integrated IP stack, as many of the Bluetooth standards call for transport protocols that rely on IP.

One aspect of the present invention is that connections are managed so as not to disrupt a network session, such as a TCP session. This aspect of the invention can be understood with reference to the OSI model for implementing protocols in seven layers. A typical definition of the model layers is as follows:

| Layer | Name | Function |
| --- | --- | --- |
| 7 | application layer | Program-to-program communication. |
| 6 | presentation layer | Manages data representation conversions. For example, the presentation layer would be responsible for converting from EBCDIC to ASCII. |
| 5 | session layer | Responsible for establishing and maintaining communications channels. In practice, this layer is often combined with the transport layer. |
| 4 | transport layer | Responsible for end-to-end integrity of data transmission. |
| 3 | network layer | Routes data from one node to another. |
| 2 | data link layer | Responsible for physical passing data from one node to another. |
| 1 | physical layer | Manages putting the data onto the network media and taking the data off. |

A TCP or UDP session is conducted at the so-called session and transport layers. One aspect of the present invention is that the handoff from a WLAN connection to a WWAN connection, for instance, is assisted from the so-called link layer. At the mobile terminal, this handoff can proceed alternatively as updating the routing table for the mobile terminal, updating the default interface of the mobile terminal, or updating the default IP address of the mobile terminal. The update may be applied either to a file kept the system directory, a location in memory, or a register. Under IPv6, the mobile terminal may retain its IP address and update its care-of routing address. In this invention, the physical layer of network media may be different for different access technologies. For example, WWAN technology typically uses GSM or CDMA as radio technology whereas WLAN technology uses CSAM/CA spread spectrum radio technology. Within the 2.4 GHz band, many different physical layer modes are used. A docked access technology provides another distinct physical layer, which may connect to a host computer or a docking station via a serial, USB or bus-connected technology and the host computer or docking station may connect to a network in any practical way. Alternatively, a docked access technology may include a network adapter on board the mobile terminal, which is plugged into an Ethernet hub or infrastructure.

Returning to FIG. 1, the mobile terminal 100 moves from one location to another. At the first location, the mobile terminal is in communication with a server 142 via a first access router 140, connected to the mobile terminal by a first access technology such as a WLAN technology. At the second location, the mobile terminal is in communication with a server 142 via a second access router 150, connected by a second access technology, such as a WWAN technology. The communications among these components are described below.

Figure 2A:
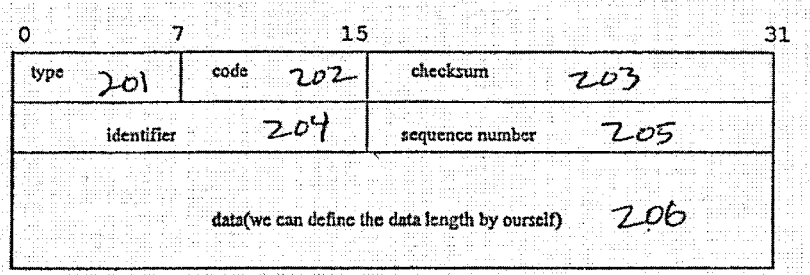
FIGS. 2A and 2B are block diagrams of a message and data structure used in a demonstration of aspects of the present invention.

FIG. 2A is a block diagram of a message format used during a demonstration of aspects of the present invention. The demonstration was carried out using an equipment configuration similar to the one depicted in FIG. 1. Access routers were stimulated on machines using a Linux operating system. Messages controlling the hand off process were formatted as ICMP packets, consistent with the Linux handling of ICMP packets. The kernel of the Linux operating system was designed only to process a few kinds of ICMP packets, including an echo request, time stamp request and address mask request. Field 201 was set to the distinct packet type "40" to differentiate demonstration packets from other ICMP packets. Field 202 contained a code that differentiated among control messages. Field 203 was used for an error control symbol. In this instance, a checksum was used. Many other error correction schemes would work equally well. Field 204 is an identifier, which was not effectively used during the demonstration. A process ID value was assigned to 204. Field 205 was loaded with a sequence number, to investigate packet loss. Data was loaded in Field 206. During part of the demonstration, packets 50 bytes long were sent out at 40 millisecond intervals.

Figure 2B:
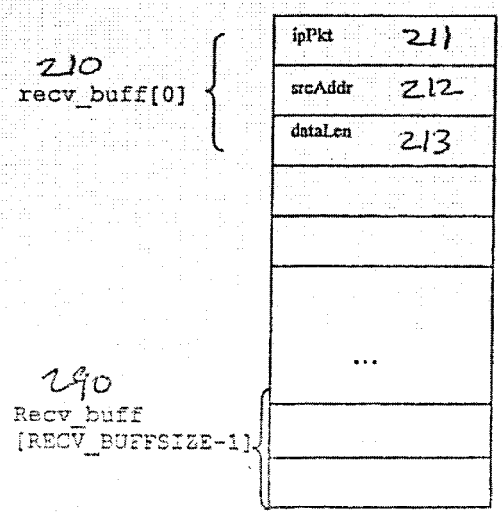

FIG. 2B is a block diagram of a receiving buffer structure implemented on the access routers during the demonstration. The buffer included a number of data triplets 210 through 290. The triplets included a pointer to a received IP packet 211, a pointer to an SRC address for an IP packet, and a link to the data field in the IP packet.

Various input/output processes can be used to handle control commands. Signal driven input output for raw sockets can be used to interrupt a main process and receive packets. Raw socket programming allows development of a routine which, after receiving a packet, builds an IP header and sends it to the proper destination, such as redirecting packets from a server to mobile terminal. Raw sockets are not bound to use TCP/UDP protocols. The kernel of the Linux operating system will pass unrecognized ICMP packets to the user defined raw socket for processing. One option for raw sockets is "non-blocking". This option enables development of a program that recognizes receipt of incoming packets even when it is sending outgoing packets. The non-blocking option can be combined with creation of multiple threads, so that processes for receiving and sending packets are implemented in separate threads.

Multithreaded programming also can be suitable for processing of control commands and for forwarding of buffer packets. Care needs to be taken with the handling of shared data when using multiple threads to implement router processes.

Figure 3:
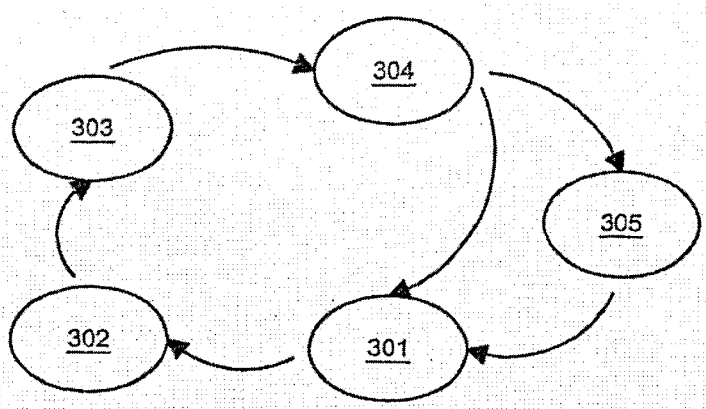
FIG. 3 is state transition diagram illustrating aspects of the present invention.

FIG. 3 is a state diagram corresponding to logic segments of one or more programs running on an access router to support hand off from one access router to another of a session between mobile terminal and a host. This state diagram applies both to the first access router, which is handing off the session, and the second access router that is taking it over. This diagram is useful in understanding the function of control messages and a protocol implementing aspects of the present invention. A so-called "initialization" message is sent by the mobile terminal to tell an access router to initialize what is needed for a new communication. An "initialization message acknowledgment", from the access router that received the initialization message to the mobile terminal that sent the initialization message, may be paired with the initialization message. A "get data" message was sent by the mobile terminal to the access router during the demonstration, without requiring an initialization message acknowledgment. For demonstration purposes, the get data message was forwarded from the access router to the server. The server responded by generating test data. A "stop code" message was sent by the mobile terminal to the access router, when the mobile terminal decided to initiate a hand off. The access router responded with a "stop message acknowledgment". A so-called "binding update" message was sent by the mobile terminal to an additional or second access router including the address of the first access router. This message could, alternatively, be generated for forwarded by the first access router after receiving the stop code message, if the first access router were provided with the address of the second access router. The second access router processed the message and forwarded it to the server, which changed its binding update table. The second access router responded with a "binding update message acknowledgment". A "handshake" message was sent from the second access router to the first access router. The first access router responded by sending its buffer data packets to the second access router, to forward to be mobile terminal. These buffer data packets were followed by a packet over message, which was used to trigger forwarding of packets from the server temporarily buffer by the second access router while it was relying packets from the first access router to the mobile terminal. Additional messages and acknowledgments, combined with time outs, can be defined depending on the reliability of communications channels among the access routers and the server. With these messages in mind, the states and state transitions in FIG. 3 can be understood.

State 301 is a so-called "normal state" in which the access router will redirect packets in a session between the mobile terminal and the server, from the mobile terminal to the server and from the server to the mobile terminal.

State 302 is a so-called "stop state" in which the access router stops sending packets to the server and buffers packets received from the server for later forwarding to an additional access router.

State 303 is a so-called "triangle state" in which buffered packets are sent from the access router to the additional access router, which, in turn, is responsible for forwarding the packets to the mobile terminal. When the access router has sent the last buffered packet, it sends a so-called "packet over" code message to the additional access router. The process initializes variables and transitions directly to state 304, without waiting for additional messages or codes.

State 304 is a so-called "start state" in which the access router is ready to receive a new communication or a so-called "binding code update" message. Any initializations not previously performed can be performed when the access router first enters this state. Otherwise, the router is waiting for directions.

State 305 is a so-called "hand off state" in which the access router may temporarily buffer packets received from the server. It relays packets received from an additional access router during its triangle state. If it has temporarily buffered packets received from the server, it forwards those packets to the mobile terminal upon receipt of a "packet over" code message from the additional access router. After the access router has relayed and transmits packets buffered by the cooperating access routers, it transitions directly to state 301, without waiting or additional messages for codes.

Figure 4:
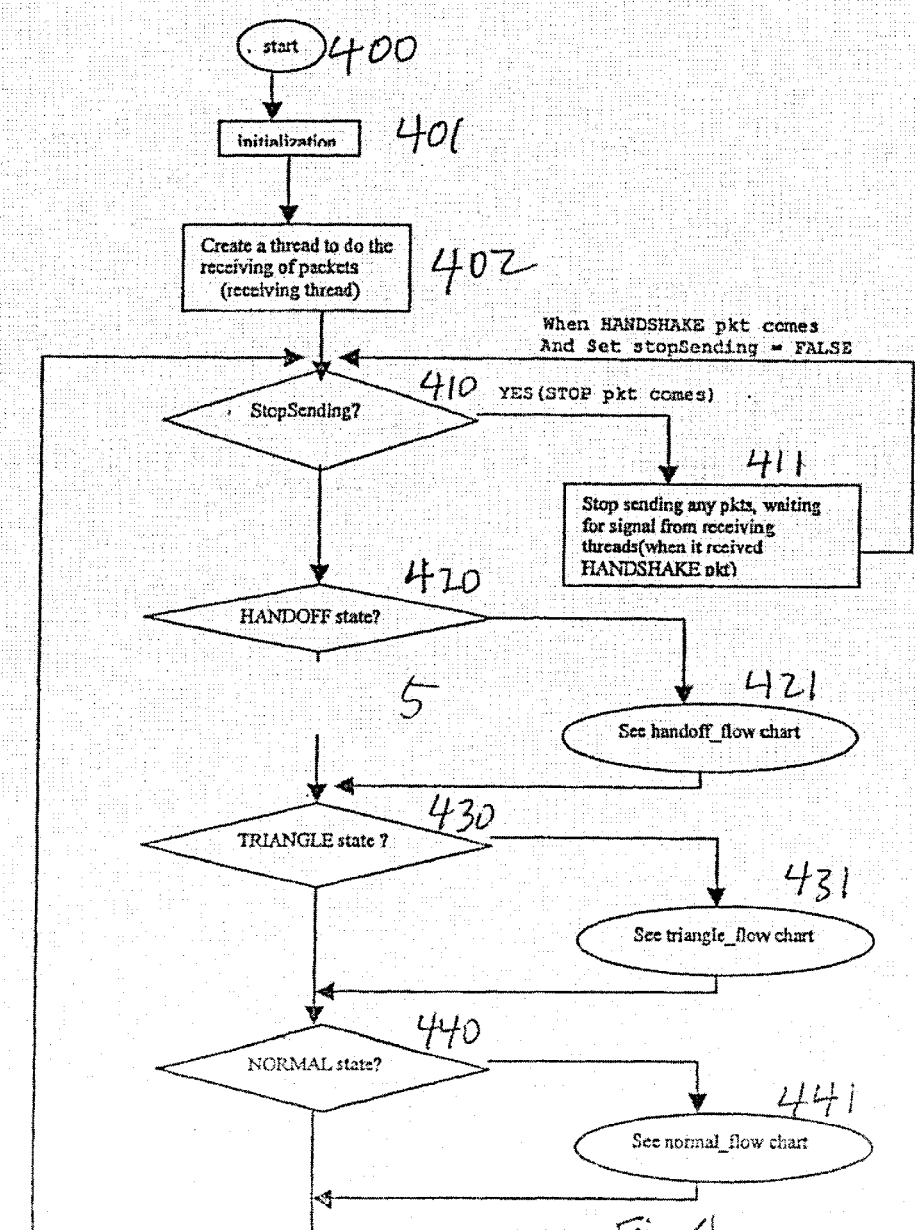
FIG. 4 is a flow chart for an entity handing off or receiving a hand off of a session between a mobile terminal and a server.

The messages from the mobile terminal and from the additional access router initiate some state transitions. FIG. 4 is a summary flowchart, which provides details regarding state transitions. The current state value was stored in a global variable. At 400, the program begins. It first enters a start state 304 and waits for an initialization message. The demonstration program processed initialization message packets when it was in either the start state 304 or the normal state 301. When the program receives an initialization message, the program sets the current state to normal state, initializes 401 the mobile terminal address, using the source address from the incoming control packet, and initializes some global variables such as the circular buffer indices. The demonstration program processed initialization message packets in either the start or normal state because the router would be in normal state after a previous communications session had finished. Initialization may include creating a thread to receive packets 402. Optionally, the program may acknowledge receipt of the initialization message.

For demonstration purposes, the get data message also was used. Processing of this get data message is not shown in FIG. 4. The program processed the get data message if it was in either a start 304 or normal 301 state. It processed the get data message in the normal 301 state because initialization messages were not acknowledged and could potentially be lost. Alternatively, initialization messages could be acknowledged. The program acknowledged receipt of the get data message. If the program was in a start state, it treated the get data message as an implied initialization message, and performed initialization 401, 402. In the normal state, the program redirected the get data message to the server, which processed the get data message as a signal to begin sending out test packets. The program running on the access router was in the normal state after processing and a get data message and proceeded to redirect packets from the server to the mobile terminal and vice versa.

The program processed the stop code message 410 when it was in the normal state 301. It set a global variable "stop sending" to true, so that a sending thread would know to stop sending out any packets. It acknowledged receipt of the stop code message to the mobile terminal. The program then transitioned 411 to the stop state 302, in which it stopped sending out any packets and waited for a signal from the receiving thread, which would indicate receipt of the handshake message. If the program was not in normal state 301 when the stop code message was received, it acknowledged the stop code message, but did not act on the message. A special error acknowledgment might be used in this situation.

Figure 5:
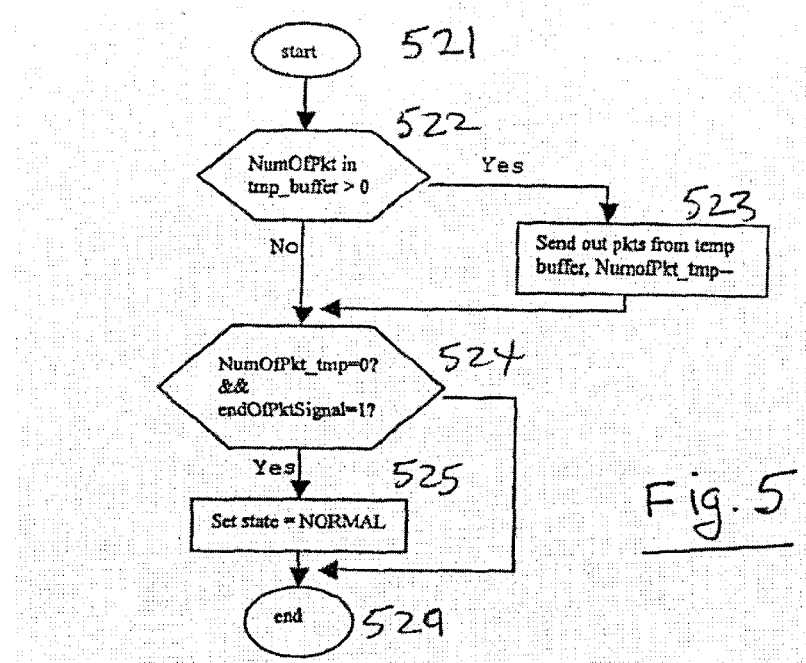
FIGS. 5 through 8 are additional flow charts related to FIG. 4.
Figure 6:
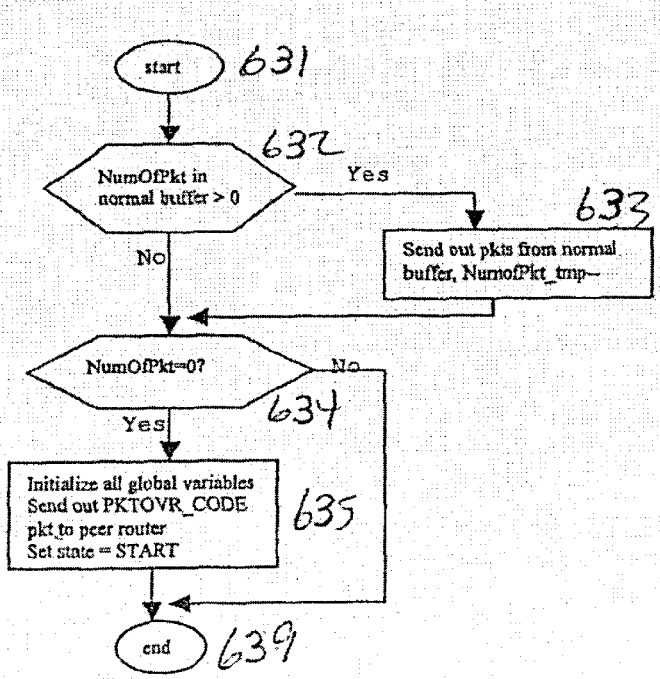
Figure 7:
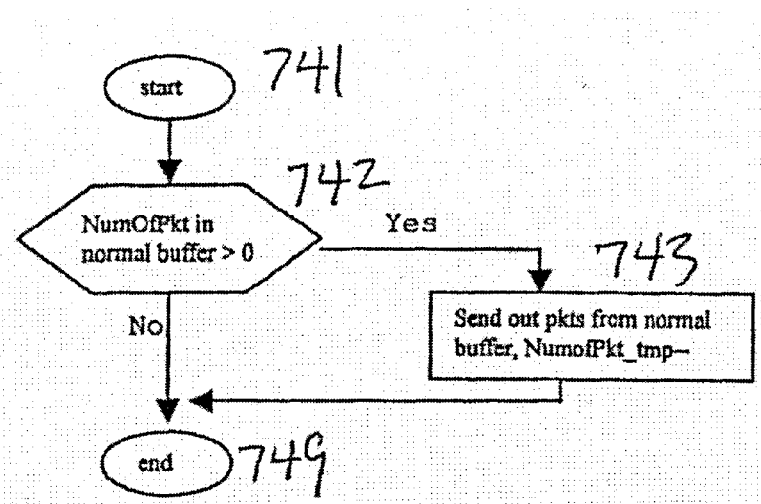

If the control packet received was not a stop sending message, the program tested 420 to determine whether it was in hand off state 421. The details of the processing a control packet received while in hand off state are shown in FIG. 5. Similarly, the program tested 430, 440 to determine whether it was in a triangle or normal state, if it was not in the hand off state. The processing of control packets received while in the triangle 431 and normal 432 states is shown in FIGS. 6 and 7. Flow returned to 410 after processing a control packet.

FIG. 5 is the handoff flow chart referred to at 421. The routine or code segment handling the handoff state starts at 521. It tests 522 whether the number of packets in a temporary buffer is greater than zero. If so, it sends out any buffered packets 523. Flow proceeds to 524, where the program tests whether the number of buffered packets is zero and a packet over code message has been received. If so, the current state is set to normal state and the state transitions. Either way, flow in this segment ends 529 and the FIG. 4 loop is repeated.

FIG. 6 is the triangle flow chart referred to in 431. The routine or code segment starts at 631. This routine tests 632 whether the number of packets in a normal buffer is greater than zero. If so, the program sends out one or more packets from the normal buffer 633. Either way, the program tests 634 whether the number of packets in the normal buffer is zero. If so, the program initializes global variables, sends out a packet over code message to an additional access router, and resets the current state to start state 635. Either way, the flow proceeds to end 639 and returns to the loop of FIG. 4.

FIG. 7 the normal flowchart referred to in 441. The routine or code segment starts at 741. This routine tests 742 whether the number of packets in the normal buffer is greater than zero. If so, the program sends out one or more packets from the normal buffer 743. Either way, flow proceeds to end 749 and returns to the loop of FIG. 4.

Figure 8:
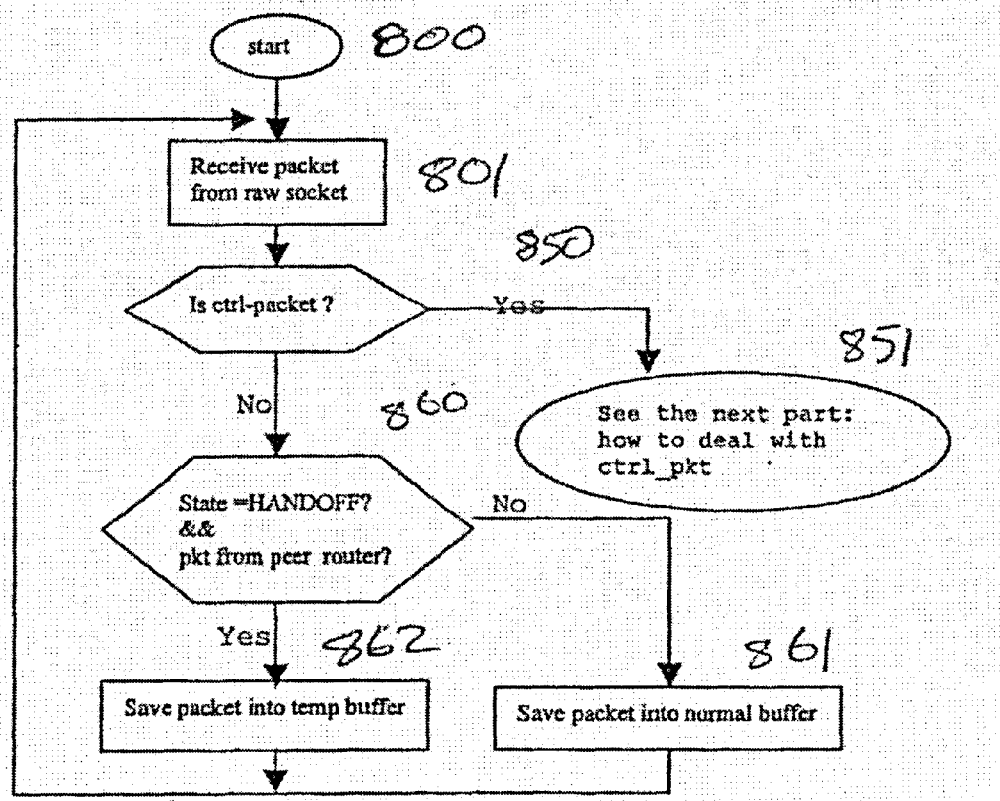

FIG. 8 is the receiving thread flow chart. The thread starts at 800. It receives a packet from a raw socket 801. It tests whether the packet is a control or message packet 850. If so, it deals with the control packet 851. If not, it tests 860 whether the current state is the hand off state and whether the packet is from the additional access router. If both conditions are true, the packet is saved into a temporary buffer 862. Otherwise, the packet is saved into a normal buffer 861. Flow loops back to receiving a packet 801.

The processing of binding update and handshake messages was not discussed in connection with the flow charts above. The binding update is normally received in the start state. The binding update message may include the address of another access router. The routine or code segment sends out a handshake code to the other access router (again, sometimes called the first access router.) The second access router transitions to handoff state and waits for the handshake acknowledgement message. It gets the address of the server that has been involved in the session with the mobile terminal. It communicates to the server a binding update directive. This directive may include the address of the access server, the old address of the mobile terminal and a new address of the mobile terminal. In IPv6, the address of the mobile terminal may not change; the directive may include a care-of address for the access router. The directive instructs the server to continue its session with the mobile terminal via the access router instead of its predecessor, the other or first access router. Alternatively, it may direct the server to continue communicating with the mobile terminal line at second access technology, different from than the first access technology previously used by the mobile terminal in the session. The steps of sending the handshake message to the first access router and the binding update message to the server can be carried out any either order. In a minor variation of this protocol, the mobile terminal could send the binding update message via the first access server to the second access server. Then, an acknowledgement of the binding update message by the second access server to the first access server would serve the same function as a handshake message. The second access router in the handoff state receives packets from the first access router, segregates them in a temporary buffer, and forwards them to the mobile terminal. Packets received from the server optionally may be buffered until all of the packets from the first access router have been forwarded. This is optional, as some transport protocols reorder packets received and thus are able to handle an out of order stream from the second access router that mixes packets from the first access router and the server. The second access router continues to receive and forward packets from the first server until it receives a packet over code message. At that point, it may send the mobile terminal packets that it has buffered during relaying of first access router packets to the mobile terminal.

The handshake message is received by the access router first involved in forwarding session packets between the mobile terminal and the server. The first access router normally receives the handshake message when it is in the stop state and is buffering packets received from the server. The handshake message may provide the address of the second access router to the first router. The first access router responds by transitioning to the triangle state and sending any buffered packets from the server to the second access router for forwarding on to the mobile terminal. The last buffered packet sent by the first access server is followed by a packet over code message. Either a reliable or unreliable transport protocol, such as TCP or UDP, can be used. A custom protocol can be used to minimize overhead. Again, if the binding update message is routed through the first access server, any knowledge that by the second access server may carry out the same function as a handshake message.

Figures 9, 10:
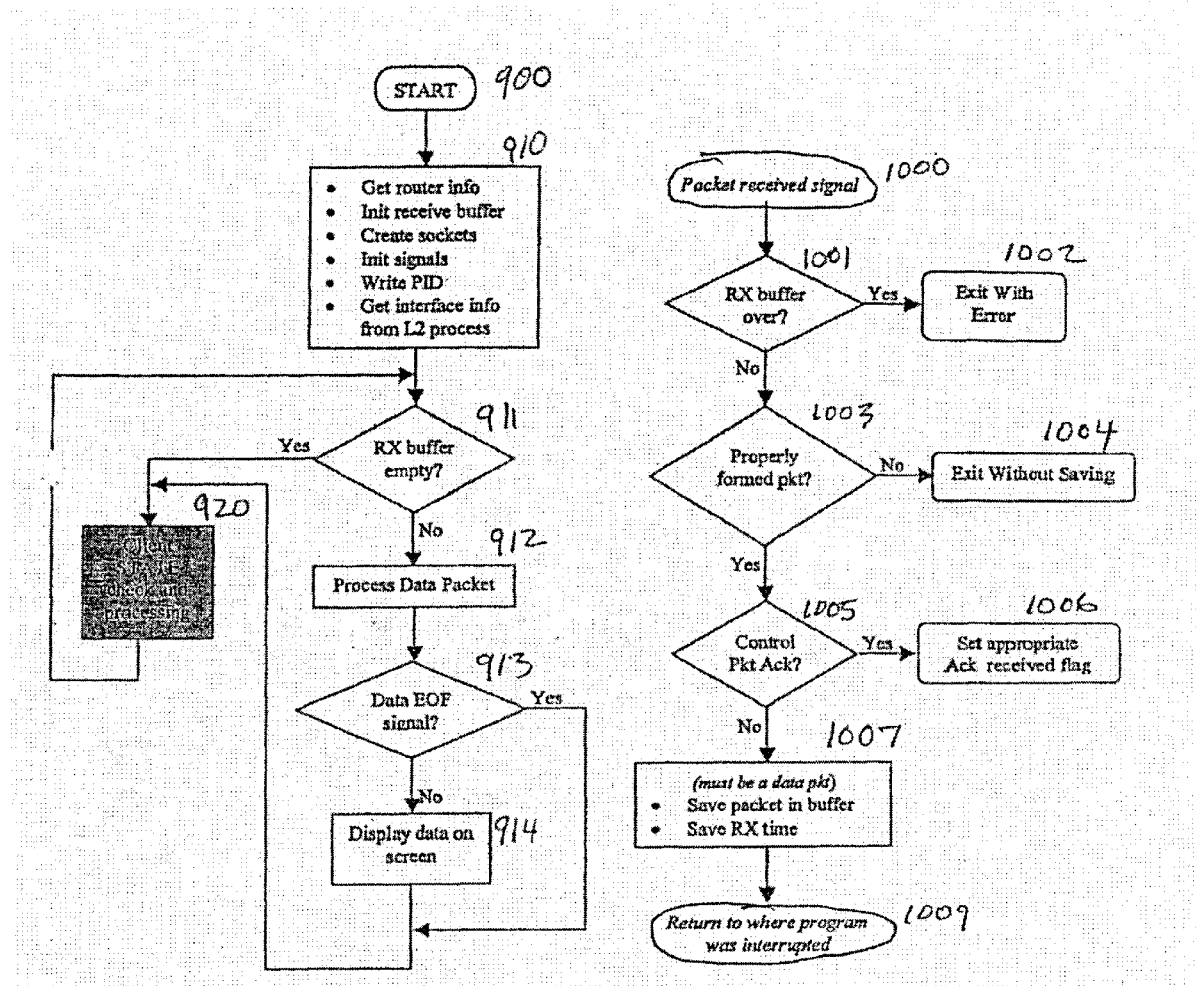

FIGS. 9 through 13 illustrate aspects of a client process operating on the mobile terminal which practices aspects of the present invention. FIG. 9 is in overview flowchart depicting logic which supplements the client state check and processing. This client process interacts with the server, the pair of access routers and a layer two, link layer process operating on the mobile terminal. The processing logic or segment starts at 900. During initialization 910, the client allocates and initializes the receive buffer, which is circular buffer. It gathers information on the router IP addresses to be used, for both the access router and the additional router access router, otherwise referred to as the first entity with an IP stack and the second entity with an IP stack. It then initializes the signals and the socket. It writes its process ID ("PID"), for the link layer process to read, in accordance with inter-process communication protocols. It waits for the link layer process to respond with its process ID, which it reads and stores for later use. It waits for interface information from the link layer, which allows it to determine whether to use the first access technology or the second access technology at startup. After initialization, the process precedes with a buffer processing loop. It tests whether the receive buffer is empty 911. If it is not empty, it processes the data packet 912. For demonstration purposes, the data packets depicted a banner which was displayed on a standard output. If an end of file signal was detected 913, display ended. Otherwise 914, the data packet was displayed on the screen. One packet was processed per iteration. If this had been an audio application, the received packet would have been piped to an audio player. Generally, an incoming packet in the data buffer would be appropriately processed. In any case, the flow then proceeds to client state check and processing 920.

Figure tended takes a program trend for receiving packets. The process is signal I/O based reception. An incoming packet was processed by routine depicted in figure tended, even has another routine was out putting packets. This process or logic segment starts at 1000. It first test for the error condition of buffer overflow 1001. It In the case of an error, it exited with an error 1002. Otherwise, check it validated at the packet was properly formed 1003. The case of an error, the routine returned without saving the packet 1004. That has, it ignored the packet. A wealth informed packet was tested to determine whether a control packet acknowledgment 1005. A control packet acknowledgment is processed by setting an appropriate flag 1006. Otherwise, for demonstration purposes, the packet necessarily was a data packet. It was saved in a buffer and the receive time recorded 1007. The routine returned to wear the program was interrupted for the signal driven I/O. Other alternatives for I/O implementation include multithreaded processes and non-blocking socket implementations.

FIG. 11 is a flowchart of the main state check and processing logic for the client running on the mobile terminal, supported by signal handling depicted in FIGS. 12 and 13. This process or logic segment starts at 1100 and implements states numbered 0–5. It maintains the states and changes states based on the control packets and signals processed. The state controller also maintains time outs and is responsible for retransmission of lost control signals. If current state equals 1 (as due to a hand off signal from the link layer) 1110, a stop signal is sent by the client process and the state reset to 2, at 1111. The process then returns 1119. If the current state equals 2 and the expected stop acknowledgement signal is received 1120, the state is reset to 3, at 1121. The process then returns 1129. If the current state equals 3 and the expected control signal is received 1130, a so called "kill if" message is sent and the state reset to 4, at 1131. The process then returns 1140. If the current state equals 5 (as due to an interface signal from the link layer) 1150, the process stands binding update and handoffs messages and the state is reset to 0, at 1151. The process then returns 1159. If the state equals 4, at 1160, the process is waiting for an interface signal from the link layer, as depicted in FIG. 13. In FIG. 13, an interface signal from the link layer is processed by logic, which changes the state from 4 to 5. After the state is changed, the logic returns to where the process was before the interface signal arrived. FIG. 12 detects processing of a handoff signal from the link layer process. When a handoff signal is received 1200, the state is reset to 1 (1201) and processing returns to where it was before the handoff signal arrived 1209.

Figures 14, 15:
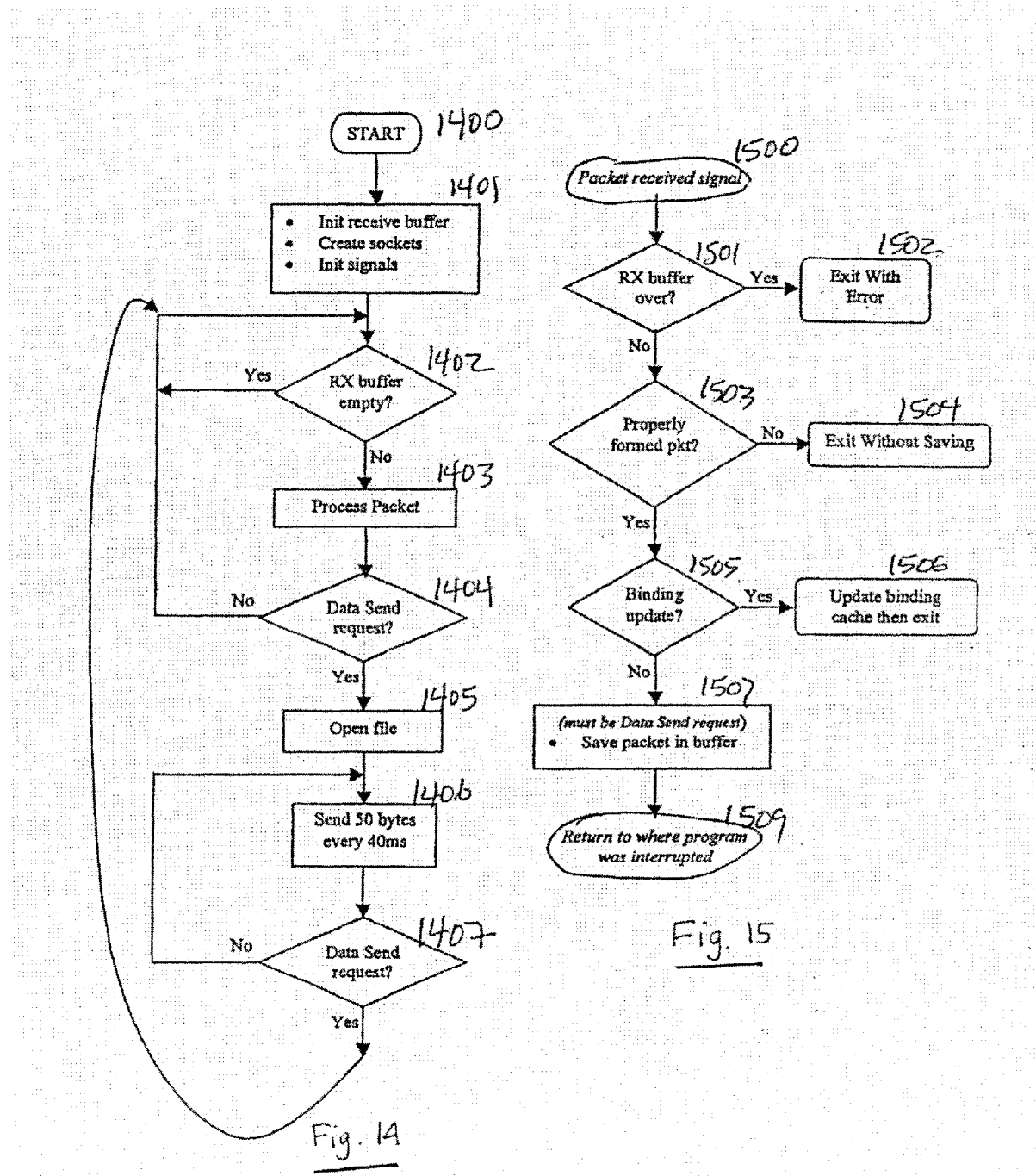
FIGS. 14 and 15 are flow charts for processes running on the server.

FIG. 14 is a flowchart of the process running on the server for demonstration purposes, supported by signal handling depicted in FIG. 15. This process logic starts at 1400. Initialization (1401) includes initialization of a receive buffer, creation of sockets and initialization of signal values. The process tests whether the receive buffer is empty 1402. If it is, the process loops and waits for the receive buffer to contain a packet or message for processing. When the buffer contains a packet 1403, the packet is processed. If the packet is a get data message, used for demonstration purposes, the server opens a file 1405 which contains certain data, and sends 50 bytes of data every 40 milliseconds 1406. If another get data message is in the receive buffer upon completion of sending the file 1407, the contents of the file are sent again. Otherwise, the flow of control loops to 1402. FIG. 15 depicts the processing of a packet received signal. The process is triggered at 1500 by the signal. It first tests for receive buffer overflow 1501, and exits with an error 1502 if the buffer overflows. Otherwise, it it tests whether the packet is properly formed 1503. If not, the process exits without saving the packet 1504, effectively ignoring the packet. It tests whether a well-formed packet is a binding update message 1505. If so, the server updates its binding cash can and exits. The implementation of this update and depends on the version of IP. Under IPv4, a new IP address for the mobile terminal is stored, updating the server's routing table. Under IPv6, a new care-of address is associated with the mobile terminal. If a well-formed packet is not a binding update message 1507, then it is interpreted as a data send request and saved in the packet buffer for processing by the loop of FIG. 14. The next word the processing of the packet received signal terminates and control returns to where the process was interrupted 1509.

Figure 16A:
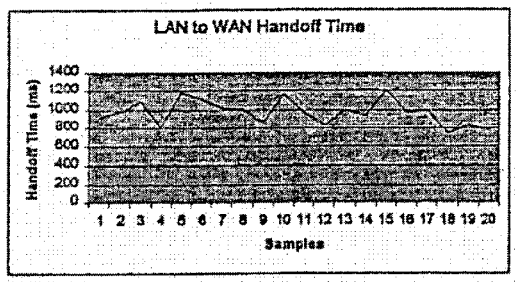
FIGS. 16A and 16B are graphs of demonstrated time for hand off between a first access technology and a second access technology, which were a WLAN and a WWAN, in this demonstration.
Figure 16B:
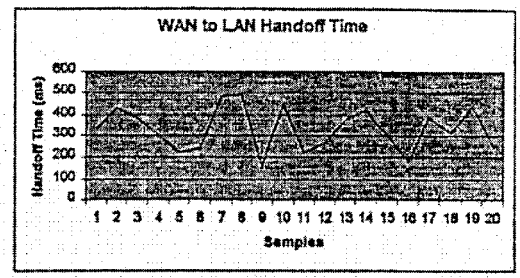

FIGS. 16A and 16B depict the time required for hand offs in a series of 20 trials. The A and B figures, respectively, illustrate measurements made with the mobile terminal moving from a WLAN to WWAN environment and vice versa.

Figure 17A:
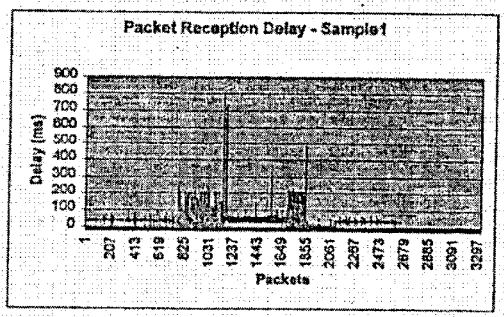
FIGS. 17A and 17B are graphs of demonstrated packet reception delay during a hand off between a first access technology and a second access technology, which were a WLAN and a WWAN, in this demonstration.
Figure 17B:
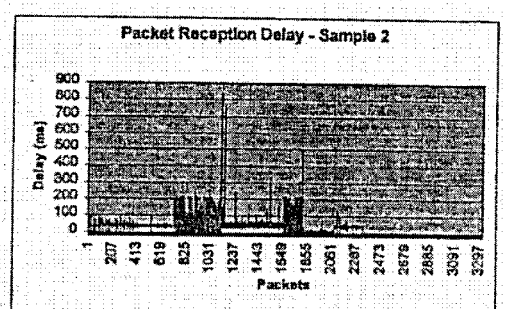

FIGS. 17A and 17B plot the delay experienced between successive receive packets during the demonstration. The A and B figures, respectively, illustrate measurements made with the mobile terminal moving from a WLAN to WWAN environment and vice versa. The actual handoff took place during the period of the local longest packet delays.

While the preceding examples are cast in terms of a method, devices and systems employing this method are easily understood. A magnetic memory containing a program capable of practicing the claimed method is one such device. A computer system having memory loaded with a program practicing the claimed method is another such device.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:

1. A method of buffering and forwarding packets to support a hand off of a session between a mobile terminal and a server, the hand off involving a first entity having an IP stack and a second entity having an IP stack, including:

(a) receiving at a first entity having an IP stack, via a first access technology, a first message from a mobile terminal to stop sending and begin buffering session packets exchanged with a server;

acknowledging the first message;

(b) receiving at a second entity having an IP stack, via a second access technology, the second access technology utilizing a different physical layer than the first access technology, a second message from the mobile terminal directing the second entity to set up a new route between the mobile terminal and the server via the second entity wherein one of the first or second access technologies uses a WLAN connection and the other of the first or second access technologies uses a WWAN connection;

acknowledging the second message;

signaling from the second entity to the first entity to start forwarding the buffered packets;

(c) receiving at the second entity the forwarded buffered packets;

relaying the forwarded buffered packets to the mobile terminal;

communicating to the server the new route; and continuing the session between the mobile terminal and the server via the new route.

2. The method of claim 1, wherein the (c) receiving step and the communicating step are carried out in an order as listed.

3. The method of claim 1, wherein the (c) receiving step and the communicating step are carried out in an order different than listed.

4. The method of claim 1, wherein the (a) receiving step and the (b) receiving step are carried out in an order as listed.

5. The method of claim 1, wherein the (a) receiving step and the (b) receiving step are carried out in an order different than listed.

6. The method of claim 1, wherein the new route is via the second entity.

7. The method of claim 1, wherein the new route utilizes the second access technology.

8. The method of claim 1, wherein communicating the new route includes communicating a new IP address for the mobile terminal and an IP address for the second entity.

9. The method of claim 1, wherein communicating the new route includes a care-of for the mobile terminal.

10. The method of claim 9, the care-of address is an IP address of the second entity.

11. The method of claim 1, wherein the first message includes data elements for message type, message code, sequence number and error detection symbol.

12. The method of claim 11, wherein the error detection symbol is a checksum.

13. The method of claim 1, wherein the first message and the second message both include data elements for message type, message code, sequence number and error detection symbol.

14. The method of claim 13, wherein the error detection symbol is a checksum.

15. The method of claim 1, wherein the first access technology is compliant with any 802.11x standard.

16. The method of claim 1, wherein the first access technology includes using an unlicensed 2.4 GHz network.

17. The method of claim 1, wherein the first access technology is compliant with any Bluetooth standard.

18. The method of claim 1, wherein the first access technology includes using an RF connection compliant with any Bluetooth standard.

19. The method of claim 1, wherein the session is a TCP session.

20. The method of claim 1, wherein the session is a UDP session.

21. The method of claim 1, wherein the session is a WAP session.

22. The method of claim 1, wherein the session includes a Bluetooth standard compliant transport session.

23. The method of claim 1, wherein the connection via the second access technology is a PPP connection.

24. The method of claim 1, wherein the second access technology is compliant with an IS 95b standard.

25. The method of claim 1, wherein the second access technology is compliant with an enhanced GSM standard.

26. The method of claim 1, wherein the second access technology is compliant with a GPRS standard.

27. The method of claim 1, wherein the second access technology is compatible with access via Metricom.

28. The method of claim 1, wherein the second access technology utilizes a cellular telephone network.

29. The method of claim 1, wherein the second access technology utilizes an unlicensed 2.4 GHz network.

30. The method of claim 1, wherein the second access technology is made using communication between a satellite and the mobile terminal for at least one direction of the second access technology connection.

31. The method of claim 1, wherein the second access technology is compliant with any Bluetooth standard.

32. The method of claim 1, wherein the second access technology includes using an RF connection compliant with any Bluetooth standard.

33. The method of claim 1, further including buffering packets received at the second access router from the server until after completion of forwarding the buffered packets to the mobile terminal.

34. A method of buffering and forwarding packets to support a hand off of a session between a mobile terminal and a server, the hand off involving a first entity having an IP stack and a second entity having an IP stack, including:

(a) receiving at a first entity having an IP stack, via a first access technology, a first message from a mobile terminal to stop-sending and begin buffering session packets exchanged with a server;

acknowledging the first message;

(b) receiving at a second entity having an IP stack a second message to set up a new route from the mobile terminal to the server via a second access technology, the second access technology utilizing a different physical layer than the first access technology;

signaling from the second entity to the first entity to start forwarding the buffered packets;

forwarding the buffered packets from the first entity to the second entity and on to the mobile terminal wherein one of the first or second access technologies uses a WLAN connection and the other of the first or second access technologies uses a WWAN connection;

communicating to the server the new route; and continuing the session between the mobile terminal and the server via the second access technology.

35. The method of claim 34, wherein the forwarding step and the communicating step are carried out in an order as listed.

36. The method of claim 34, wherein the forwarding step and the communicating step are carried out in an order different than listed.

37. The method of claim 34, wherein the (a) receiving step and the (b) receiving step are carried out in an order as listed.

38. The method of claim 34, wherein the (a) receiving step and the (b) receiving step are carried out in an order different than listed.

39. The method of claim 34, wherein the new route is via the second entity.

40. The method of claim 34, wherein the new route utilizes the second access technology.

41. The method of claim 34, wherein communicating the new route includes communicating a new IP address for the mobile terminal and an IP address for the second entity.

42. The method of claim 34, wherein communicating the new route includes a care-of for the mobile terminal.

43. The method of claim 42, the care-of address is an IP address of the second entity.

44. The method of claim 34, further including buffering packets received at the second access router from the server until after completion of forwarding the buffered packets to the mobile terminal.

45. A method of buffering and forwarding packets to support a hand off involving a first entity having an IP stack and a second entity having an IP stack, the first entity supporting communication with a mobile terminal via a first access technology, the second entity supporting communication with the mobile terminal via a second access technology and the mobile terminal engaged in a session with a server via the first access technology, the method including:

receiving at the second entity a message to set up a new route from the mobile terminal to a server via the second access technology, the second access technology utilizing a different physical layer than the first access technology wherein one of the first or second access technologies uses a WLAN connection and the other of the first or second access technologies uses a WWAN connection;

communicating to the server the new route;

signaling from the second entity to the first entity to forward any buffered packets;

forwarding the buffered packets from the first entity to the second entity and on to the mobile terminal; and continuing the session between the mobile terminal and the server via the second access technology.

46. The method of claim 45, wherein the (c) receiving step and the communicating step are carried out in an order as listed.

47. The method of claim 45, wherein the (c) receiving step and the communicating step are carried out in an order different than listed.

48. The method of claim 45, wherein the new route is via the second entity.

49. The method of claim 45, wherein the new route utilizes the second access technology.

50. The method of claim 45, wherein communicating the new route includes communicating a new IP address for the mobile terminal and an IP address for the second entity.

51. The method of claim 45, wherein communicating the new route includes a care-of for the mobile terminal.

52. The method of claim 51, the care-of address is an IP address of the second entity.

53. The method of claim 45, the first message includes data elements for message type, message code, sequence number and error detection symbol.

54. The method of claim 53, wherein the error detection symbol is a checksum.

55. The method of claim 45, wherein the first message and the second message both include data elements for message type, message code, sequence number and error detection symbol.

56. The method of claim 55, wherein the error detection symbol is a checksum.

57. The method of claim 45, wherein the first access technology is compliant with any 802.11x standard.

58. The method of claim 45, wherein the first access technology includes using an unlicensed 2.4 GHz network.

59. The method of claim 45, wherein the first access technology is compliant with any Bluetooth standard.

60. The method of claim 45, wherein the first access technology includes using an RF connection compliant with any Bluetooth standard.

61. The method of claim 45, wherein the session is a TCP session.

62. The method of claim 45, wherein the session is a UDP session.

63. The method of claim 45, wherein the session is a WAP session.

64. The method of claim 45, wherein the session includes a Bluetooth standard compliant transport session.

65. The method of claim 45, wherein the connection via the second access technology is a PPP connection.

66. The method of claim 45, wherein the second access technology is compliant with an IS 95b standard.

67. The method of claim 45, wherein the second access technology is compliant with an enhanced GSM standard.

68. The method of claim 45, wherein the second access technology is compliant with a GPRS standard.

69. The method of claim 45, wherein the second access technology is compatible with access via Metricom.

70. The method of claim 45, wherein the second access technology utilizes a cellular telephone network.

71. The method of claim 45, wherein the second access technology utilizes an unlicensed 2.4 GHz network.

72. The method of claim 45, wherein the second access technology is made using communication between a satellite and the mobile terminal for at least one direction of the second access technology connection.

73. The method of claim 45, wherein the second access technology is compliant with any Bluetooth standard.

74. The method of claim 45, wherein the second access technology includes using an RF connection compliant with any Bluetooth standard.

75. The method of claim 45, further including buffering packets received at the second access router from the server until after completion of forwarding the buffered packets to the mobile terminal.

76. A second entity having an IP stack adapted to accepting from a first entity having an IP stack a hand off between a first access technology and a second access technology of a session between a mobile terminal and a server, the second entity including:
   a processor, having memory and resources, including an IP stack;
   one or more communication ports, coupled with the processor, in communication with the first entity and in communication with the mobile terminal;
   program storage memory, coupled with the processor, containing one or more programs adapted to:
      receiving at a second entity having an IP stack, via a second access technology, the second access technology utilizing a different physical layer than the first access technology, a second message from the mobile terminal directing the second entity to set up a new route between the mobile terminal and the server via the second entity wherein one of the first or second access technologies uses a WLAN connection and the other of the first or second access technologies uses a WWAN connection;
      acknowledging the second message;
      signaling from the second entity to the first entity to start forwarding the buffered packets;
      receiving at the second entity the forwarding buffered packets;
      relaying the forwarded buffered packets to the mobile terminal wherein one of the first or second access technologies uses a WLAN connection and the other of the first or second access technologies uses a WWAN connection;
      communicating to the server the new route; and
      continuing the session between the mobile terminal and the server via the new route.

77. A first entity having an IP stack adapted to adapting to giving a second entity having an IP stack a hand off between a first access technology and a second access technology of a session between a mobile terminal and a server, first entity including:
   a processor, having memory and resources, including an IP stack;
   one or more communication ports, coupled with the processor, in communication with the first entity and in communication with the mobile terminal;
   program storage memory, coupled with the processor, containing one or more programs adapted to:
      receiving at a first entity having an IP stack a first access technology a first message from a mobile terminal to stop sending and begin buffering session packets exchanged with a server;
      acknowledging the first message;
      receiving from the second entity a signal to start forwarding the buffered packets;
      forwarding the buffered packets from the first entity to the second entity, to be forwarded on to the mobile terminal;
      communicating to the server a care-of-address for routing via the second access technology; and
      continuing the session between the mobile terminal and the server via the second access technology wherein one of the first or second access technologies uses a WLAN connection and the other of the first or second access technologies uses a WWAN connection.

78. A second entity having an IP stack adapted to accepting from a first entity having an IP stack a hand off between a first access technology and a second access technology of a session between a mobile terminal and a server, including:

a processor, having memory and resources, including an IP stack;

one or more communication ports, coupled with the processor, in communication with the first entity and in communication with the mobile terminal;

program storage memory, coupled with the processor, containing one or more programs adapted to:
  receiving at the second entity a message to set up a new route from the mobile terminal to the server via the second access technology, the second access technology utilizing a different physical layer than the first access technology wherein one of the first or second access technologies uses a WLAN connection and the other of the first or second access technologies uses a WWAN connection;
  communicating to the server the new route;
  signaling from the second entity to the first entity to forward any buffered packets;
  forwarding the buffered packets from the first entity to the second entity and on to the mobile terminal; and
  continuing the session between the mobile terminal and the server via the second access technology.

79. An entity having an IP stack, adapted to cooperate with an additional entity having an IP stack in a hand off of a session between a mobile terminal and a server, the entity including:

a processor, having memory and resources, the resources including an IP stack;

one or more communication ports, coupled with the processor and in communication with the mobile terminal, the server and the additional entity;

program storage memory, coupled with the processor, containing one or more programs, including logic segments to
  (1) forward packets in the session between the mobile terminal and the server;
  (2) stop forwarding the packets in the session and buffer the packets received from the server;
  (3) forward the buffered packets to the additional entity;
  (4) wait for a message to take over the session between the mobile terminal and the server; and
  (5) communicate an address of the entity to the server with a binding update directive; signal the additional entity to begin forwarding the buffered packets; and forward the buffered packets received from the additional entity to the mobile terminal;

wherein the one or more programs transition among logic segments, including:
  transitioning from logic segment (1) to logic segment (2) upon receiving a first message type from the mobile terminal;
  transitioning from logic segment (2) to logic segment (3) upon receiving a second message type from the additional entity;
  transitioning from logic segment (3) to logic segment (4) upon completing the forwarding of buffered packets to the additional entity;
  transitioning from logic segment (4) to logic segment (1) upon receiving an initial message type from the mobile terminal;
  transitioning from logic segment (4) to logic segment (5) upon receiving a third message type from the additional entity;
  transitioning from logic segment (5) to logic segment (1) upon receiving a fourth message type from the additional entity indicating completion of forwarding of the buffered packets.

80. The device of claim 79, wherein logic segment (5) carries out actions in an order as listed.

81. The device of claim 79, wherein logic segment (5) carries out actions in an order different than listed.

82. The device of claim 79, wherein:
  logic segment (5) further includes temporarily buffering any packets received from the server while forwarding the buffered packets received from the additional entity to the mobile terminal; and
  transitioning from logic segment (5) to logic segment (1) further includes forwarding to the mobile terminal the temporarily buffered packets received from the server upon receiving the fourth message type from the additional entity.

* * * * *